(12) United States Patent
Williams

(10) Patent No.: US 8,229,101 B1
(45) Date of Patent: Jul. 24, 2012

(54) PUNCTUALITY CALL CENTER METRIC

(75) Inventor: Mark J. Williams, North Canton, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 2121 days.

(21) Appl. No.: 10/955,086

(22) Filed: Sep. 30, 2004

(51) Int. Cl.
*H04M 3/00* (2006.01)

(52) U.S. Cl. .............................. 379/266.04; 379/265.01

(58) Field of Classification Search ............. 379/266.09, 379/265.01
See application file for complete search history.

(56) References Cited

U.S. PATENT DOCUMENTS

| | | | |
|---|---|---|---|
| 5,227,884 A | | 7/1993 | Davies |
| 5,592,542 A | * | 1/1997 | Honda et al. .............. 379/266.05 |
| 5,867,572 A | * | 2/1999 | MacDonald et al. ..... 379/266.06 |
| 5,903,641 A | * | 5/1999 | Tonisson ................... 379/265.12 |
| 6,563,921 B1 | | 5/2003 | Williams et al. |
| 7,640,355 B1 | * | 12/2009 | Marshall et al. .............. 709/232 |

* cited by examiner

*Primary Examiner* — Rasha Al Aubaidi
(74) *Attorney, Agent, or Firm* — Pearne & Gordon LLP

(57) ABSTRACT

A method of measuring server performance includes recording a time of queuing a request by a client for primary resources managed by the server; recording an estimated wait time for responding to the request for primary resources; recording a time of service for the request for primary resources; and calculating a punctuality metric of the request for primary resources by subtracting the difference between the time of service and the time of queuing from the estimated wait time. The punctuality metric is representative of the performance of the server.

2 Claims, 4 Drawing Sheets

PUNCTUALITY CALL CENTER METRIC

BACKGROUND OF THE INVENTION

The present invention relates to the management of telephone call centers and, in particular, to a metric for evaluating the performance of such centers.

Call centers typically receive calls for agents. The agents are the primary resource in this situation. If an agent is not available, the call may be placed in a queue to wait for an agent. Increasingly, the caller is provided with an estimate of the wait time before an agent will become available. If this wait time is inaccurate, particularly if it substantially understates the actual wait time to connection to an agent, the caller is likely to be negatively influenced by the experience.

This problem can be generalized to servers managing primary resources where requests for primary resources by clients are made at a rate in excess of the availability of these resources.

Automatic call directors (ACDs) and their more simpleminded cousins, private branch exchanges, are used to connect callers with agents and other resources (e.g., modems, facsimile machines, voice mail, etc.). The typical ACD connects callers with resources until all resources are in use. At that point, further callers are placed in a hold queue until a resource becomes available. Normally the first in this hold queue will be the first out of the queue (i.e., a first in first out (FIFO) queue). ACDs are typically the backbone of a call center.

Current ACDs are designed to handle callers in the described manner. A caller waits in the queue until a resource is available and is removed from the queue upon being connected to a resource. If the caller is returned to the queue for some reason, the callers will be added to the end of the queue. For example, ACDs manufactured by Lucent, Siemens, and Nortel operate in this manner.

Increasing there are resources that may be thought of as secondary resources, not the reason for the call or request like primary resources, but a resource that the caller may be connected to prior to being connected to the desired primary resource.

Resources that may be classified as secondary resources include voice mail (for voice mail independent of the main call (e.g., expressing an opinion of the calling experience while waiting for the primary resource)); information on demand systems, that provide prerecorded information on topics chosen by the caller while waiting; or non-agent telephones (e.g., calling a particular party on an ancillary matter while waiting for the primary resource).

Another secondary resource is an automatic call back system. These systems take a call on hold, obtain call back information and call back the caller at some future time. Such systems are disclosed in U.S. Pat. Nos. 5,227,884 and 6,563,921 which are incorporated herein by reference.

SUMMARY OF THE INVENTION

A method of measuring server performance includes recording a time of queuing a request by a client for primary resources managed by the server; recording an estimated wait time for responding to the request for primary resources; recording a time of service for the request for primary resources; and calculating a punctuality metric of the request for primary resources by subtracting the difference between the time of service and the time of queuing from the estimated wait time. The punctuality metric is representative of the performance of the server.

DESCRIPTION OF THE PREFERRED EMBODIMENTS

Figure 1:
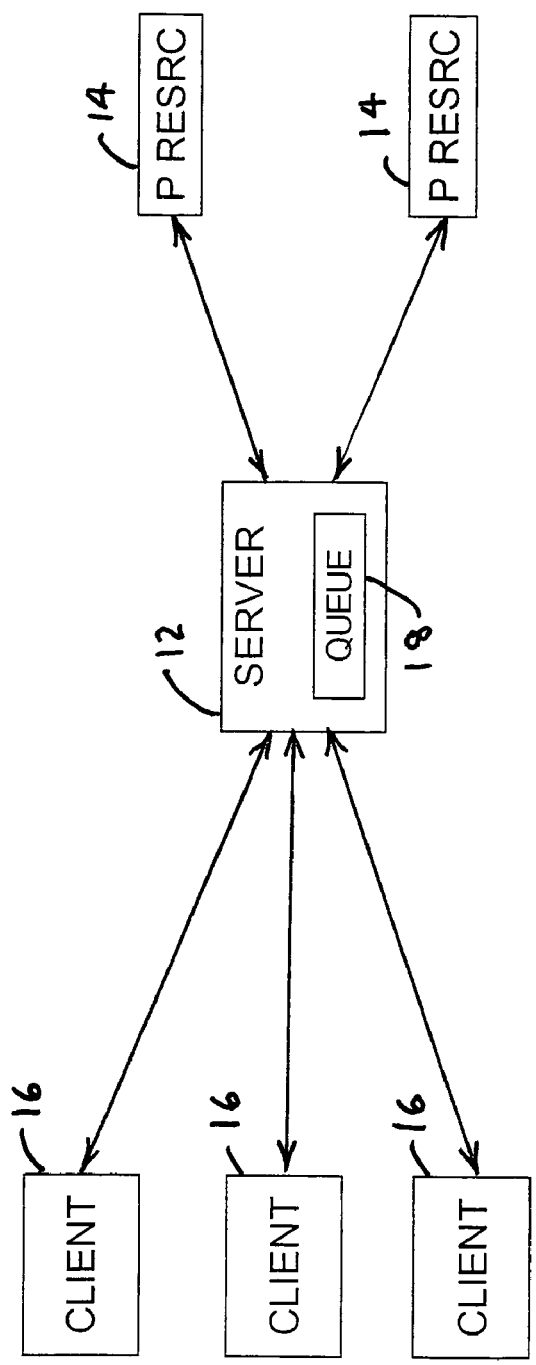
FIG. 1 is a block diagram of a system suitable for practicing the invention.

Referring to FIG. 1, a server 12 manages the availability of primary resources 14 and receives requests for primary resources 14 from clients 16. If a primary resource is not currently available, the request is stored in the queue 18 of the server 12, the time of queuing is recorded and the server 12 notifies the client that the estimated wait time for a primary resource is a time EWT which is also recorded.

The detailed calculation of EWT is beyond the scope of the present invention, but in general, it may be determined, for example, by averaging the actual wait times occurring over some period of interest.

When a primary resource becomes available, the server 12 connects the primary resource to the client and records the time of service.

The server 12 then calculates the punctuality metric of the request by subtracting the difference between the time of service and the time of queuing from the EWT.

The punctuality metric is a measure of the performance of the server 12. It may be employed, for example, to indicate the need for adjustment of the EWT calculation. A possible scenario would be to average the punctuality metric for several calls and subtract the result from future EWT values. This could continue until the calculated punctuality was within a desired range.

However, the punctuality metric, particularly if it is negative indicating a longer wait to service than estimated, is an important measure in of itself of server performance as it relates to client satisfaction. For example, callers, already unhappy about being unable to immediately reach agents, become even more unhappy if the punctuality metric is a large negative number.

The server 12 is normally a programmable device that may be conveniently programmed to perform the described steps. In the unlikely case it is not programmable, a programmable device may be added to communicate with the server and perform the steps.

Figure 2:
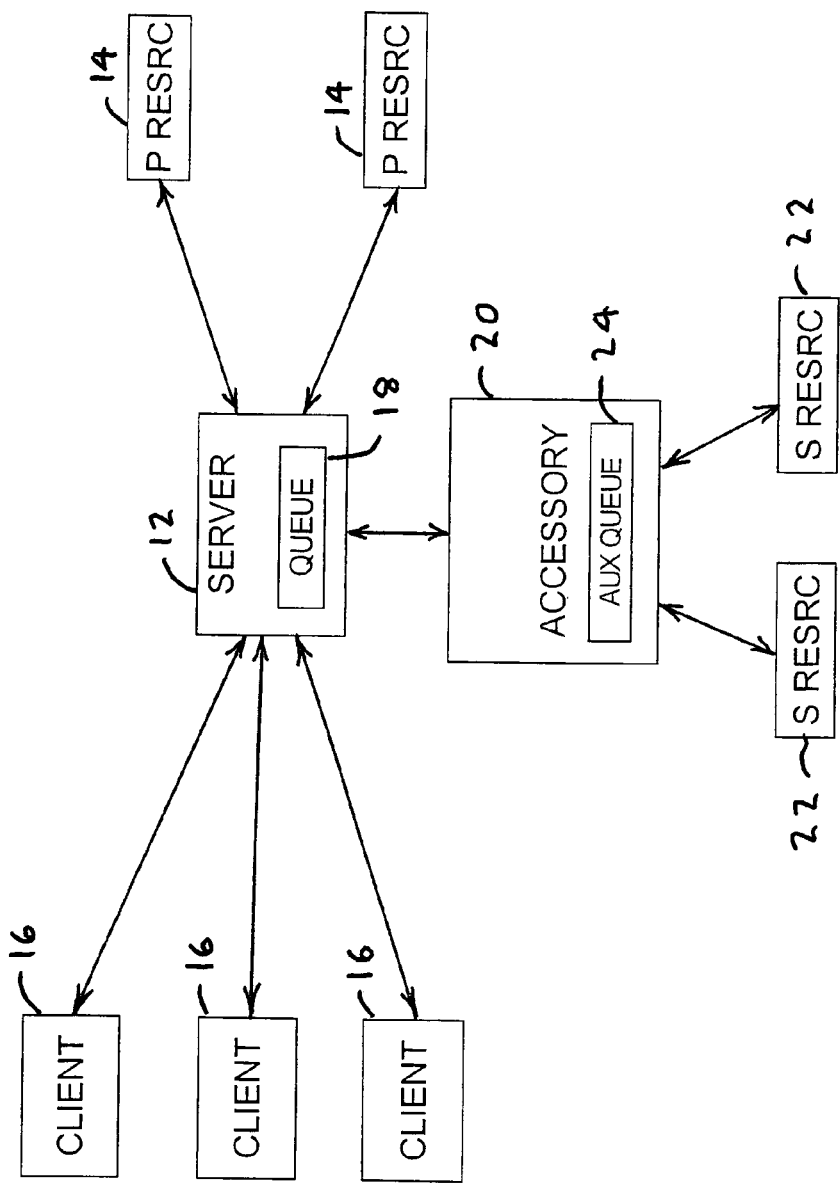
FIG. 2 is a block diagram of another system suitable for practicing the invention.

Referring to FIG. 2, a similar configuration adds an accessory device 20 and secondary resources 22. This configuration is useful where the queue 18 cannot be managed satisfactorily by the server 12. For example, it is common in some servers for the routing of a primary resource request temporarily to a secondary resource to result in the request being removed from the queue 18 and for the request to then be placed at the end of the queue 18 when access to the secondary resource is ended. The device 20 serves to overcome this limitation in the server 12. The device 20 is also a programmable device that may be conveniently programmed to perform the desired functions.

The device 20 intercepts primary resource requests from the server 12 and manages the request in its own auxiliary queue 24 instead of using the queue 18. After no further manipulation of the auxiliary queue 24 is desired, the device 20 returns the request to the server 12 for the server 12 to transfer the request to a primary resource 14. Prior to returning the request to the server 12, the device 20 will typically transfer the request to at least one secondary resource 22. However, the device 20, unlike the server 12 will maintain the request in the auxiliary queue 24 while the request accesses a secondary resource.

When a request is transferred to a secondary resource and then the request is transferred to a primary resource, the server 12 is generally unaware of the client 16 accessing the secondary resource 22. This is because the request was being primarily managed by the auxiliary queue 24, that is, the accessory device 20 manages the primary queue 18 with the auxiliary queue 24. The time of queuing and the EWT are recorded in the device 20.

Two approaches or a combination thereof are employed to calculate the punctuality metric. In the first, the device 20 calculates the punctuality metric itself (and perhaps the EWT as well, rather than receiving it from the server 12). In the second, the device 20 not only returns the request to the server 12, but also passes sufficient information associated with the request (such as the original EWT and original time of queuing) to the server 12 to permit the server 12 to calculate the punctuality metric.

Figure 3:
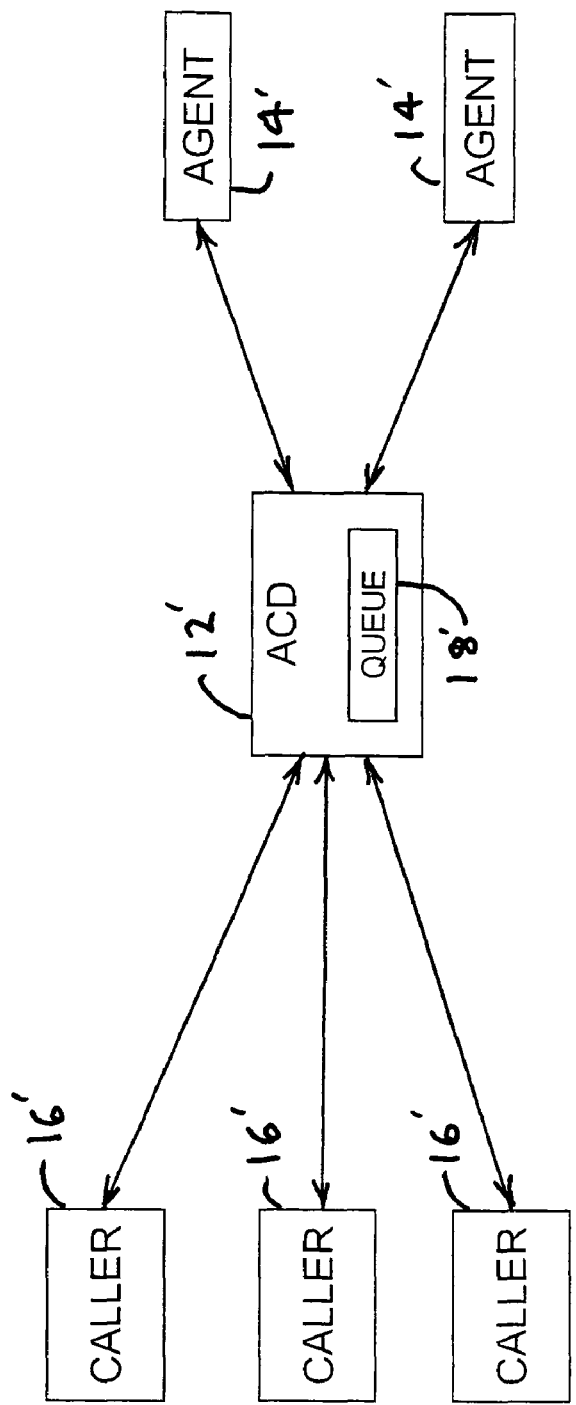
FIG. 3 is a block diagram of a call center suitable for practicing the invention.

Referring to FIG. 3, a call center includes an ACD 12', agents 14' and callers 16'. the server 12' manages the availability of agents 14' and receives requests for agents 14' from callers 16'. If an agent is not currently available, the call is stored in the queue 18' of the ACD 12', the time of queuing is recorded and the ACD 12' notifies the caller of the EWT which is also recorded.

When an agent becomes available, the ACD 12' connects the agent to the caller and records the time of service.

The ACD 12' then calculates the punctuality metric of the request by subtracting the difference between the time of service and the time of queuing from the EWT.

The ACD 12 is normally a programmable device that may be conveniently programmed to perform the described steps. In the unlikely case it is not programmable, a programmable device may be added to communicate with the ACD and perform the steps.

Figure 4:
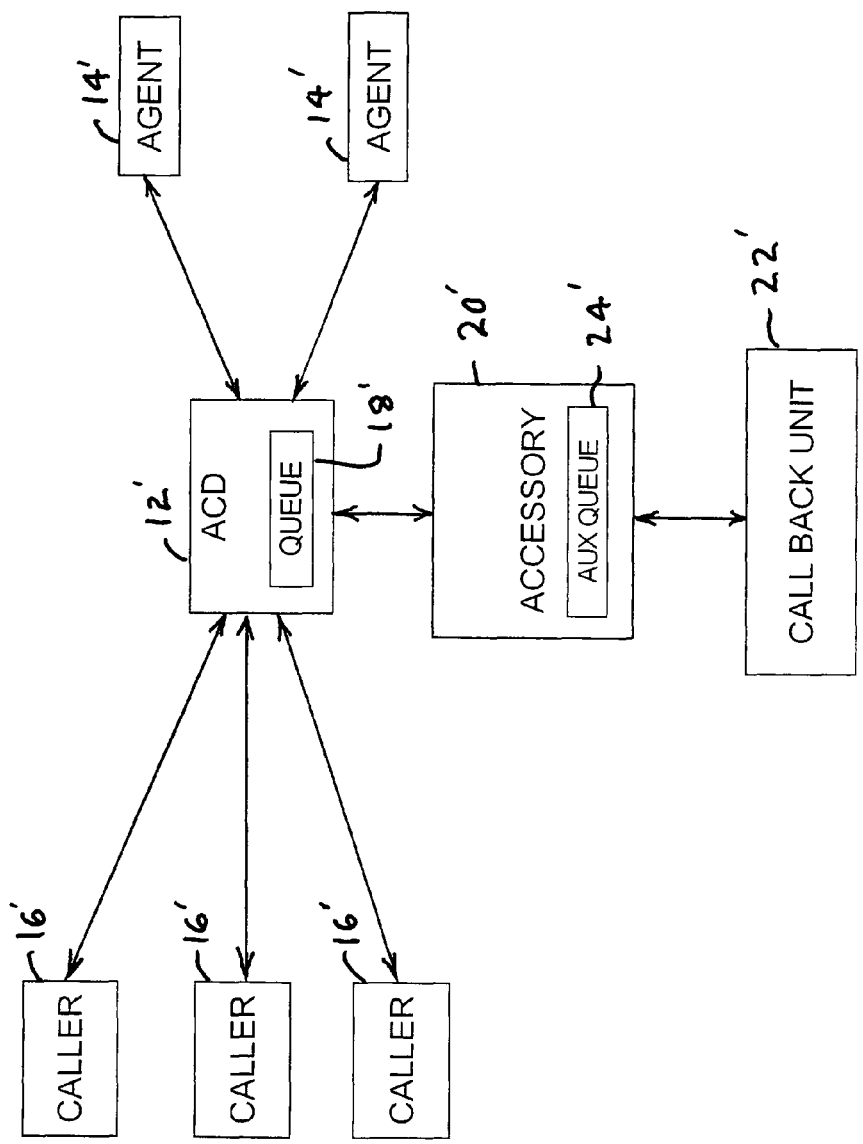
FIG. 4 is a block diagram of another call center suitable for practicing the invention.

Referring to FIG. 4, a similar configuration adds an accessory device 20' and an automatic call back unit 22'. The unit 22' records a caller's particulars, physically disconnects the caller, and reconnects to the caller at some desired future time when an agent is available. From the ACD's perspective, it appears that the call was just on hold. The device 20' is also a programmable device that may be conveniently programmed to perform the desired functions.

The device 20' intercepts calls from the ACD 12' and manages the call in its own auxiliary queue 24' instead of using the queue 18'. After no further manipulation of the auxiliary queue 24' is desired, the device 20' returns the request to the ACD 12' for the ACD to transfer the call to an agent. Prior to returning the request to the ACD 12', the device 20' will typically transfer the call to the unit 22'. However, the device 20, unlike the ACD 12' will maintain the call in the auxiliary queue 24' while the call is being processed by the unit 22'.

When a call is transferred to the unit 22' and then the call is transferred to an agent, the ACD 12' is generally unaware of the caller 16' accessing the unit 22'. This is because the request was being primarily managed by the auxiliary queue 24', that is, the accessory device 20' manages the primary queue 18' with the auxiliary queue 24'. The time of queuing and the EWT are recorded in the device 20'.

Two approaches or a combination thereof are employed to calculate the punctuality metric. In the first, the device 20 calculates the punctuality metric itself (and perhaps the EWT as well, rather than receiving it from the ACD 12'). In the second, the device 20 not only returns the request to the ACD 12', but also passes sufficient information associated with the request (such as the original EWT and original time of queuing) to the ACD 12' to permit the ACD 12' to calculate the punctuality metric.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method of measuring server performance, said server having a primary queue and an accessory device having an auxiliary queue, said accessory device managing said primary queue with said auxiliary queue, said method comprising:
   intercepting from said primary queue a request by a client for primary resources managed by said server;
   queuing said request for primary resources in said auxiliary queue;
   recording in said accessory device a time of queuing said request for primary resources;
   recording in said accessory device an estimated wait time for responding to said request for primary resources;
   returning said request for primary resources to said primary queue;
   recording a time of service for said request for primary resources; and
   calculating a punctuality metric of said request for primary resources by subtracting the difference between said time of service and said time of queuing from said estimated wait time, said punctuality metric being representative of the performance of said server.

2. A method of measuring the performance of an automatic call director, said automatic call director having a primary queue and an accessory device having an auxiliary queue, said accessory device managing said primary queue with said auxiliary queue, said method comprising:
   intercepting a call from said primary queue;
   queuing said call in said auxiliary queue;
   recording in said accessory device a time of queuing a said call;
   recording in said accessory device an estimated wait time for said call;
   returning said call to said primary queue;
   recording a time of service for said call; and
   calculating a punctuality metric of said call by subtracting the difference between said time of service and said time of queuing from said estimated wait time, said punctuality metric being representative of the performance of said automatic call director.

* * * * *

UNITED STATES PATENT AND TRADEMARK OFFICE
CERTIFICATE OF CORRECTION

PATENT NO.       : 8,229,101 B1
APPLICATION NO.  : 10/955086
DATED            : July 24, 2012
INVENTOR(S)      : Mark J. Williams It is certified that error appears in the above-identified patent and that said Letters Patent is hereby corrected as shown below:

Column 4, line 52, after "queuing" delete "a".

Signed and Sealed this
Second Day of October, 2012

David J. Kappos
*Director of the United States Patent and Trademark Office*